Patented Jan. 18, 1944

2,339,347

UNITED STATES PATENT OFFICE 2,339,347

PROCESS FOR MAKING LOWER DICARBONYLIC COMPOUNDS

Raymond W. McNamee, South Charleston, and Jesse T. Dunn, Charleston, W. Va., assignors to Carbide and Carbon Chemicals Corporation, a corporation of New York No Drawing. Application July 30, 1940, Serial No. 348,440

3 Claims. (Cl. 260—603)

The 1,2-dicarbonylic compounds having from two to three carbon atoms may be obtained at present by careful oxidation of ethylene or propylene glycol with chemical oxidizing agents, notably nitric acid and selenium dioxide. The disadvantages of such methods are the cost of the oxidizing agents required and the explosive and toxic hazards involved.

It has been proposed to manufacture these dicarbonylic compounds by the direct oxidation of ethylene or propylene glycol with molecular oxygen in amounts less than that theoretically required, i. e., less than one mol of molecular oxygen per mol of glycol. This method of operation is not completely successful because lower oxidation products of these glycols than dicarbonylic compounds are produced and the dicarbonylic compounds which are formed are extremely difficult if not impossible to isolate in the free state. This is because the dicarbonylic compounds have a pronounced tendency to react with the excess glycol present to form high-boiling, stable acetals or other complex condensation products.

The object of this invention is to prepare the aforesaid 1-2 dicarbonylic compounds by the direct oxidation of ethylene glycol or propylene glycol or their polyglycol homologs, in a form from which the pure compounds, or their hydrates or polymers, can be isolated, while avoiding adverse catalytic effects.

This invention provides specific improvements in the process of making the lower dicarbonylic compounds, glyoxal and pyruvic aldehyde, by the direct oxidation of the alkylene glycols, ethylene and propylene glycols, respectively, or the corresponding polyalkylene glycols, such as the di-, tri-, tetra-, penta-, or hexa-modifications, whereby a material of construction for the equipment used to carry out the reaction is employed which does not exert an adverse catalytic effect on the oxidation of the glycols to the corresponding dicarbonylic compounds.

Glyoxal and pyruvic aldehyde are chemicals of interesting and unusual properties. Glyoxal is a greenish-yellow solid melting at 15° C. and boiling at 51° C. It is difficult to isolate in the monomeric form because it polymerizes readily and because it readily forms a colorless hydrate with water. Pyruvic aldehyde is a low-boiling liquid of similar properties. Both chemicals are extremely reactive by virtue of the two carbonyl groups which they contain and they are useful as intermediates in a variety of syntheses. By means of this invention, these products may be produced in economic yields which enables their reactive characteristics to be utilized industrially.

The oxidation of the glycols previously mentioned to dicarbonylic compounds is conducted in the vapor phase and preferably in the presence of an oxidation catalyst. The catalyst which may be selected for promoting the desired oxidation is preferably composed of copper and several forms of copper catalysts may be used. A particularly effective type is one composed of turnings of a copper alloy containing from 94.4% to 96% copper, from 3% to 4.5% silicon and from 1.0% to 1.1% manganese. A supported copper catalyst may be formed by impregnating particles of a catalyst support consisting of ceramically bonded fused aluminum oxide with a concentrated boiling solution of copper nitrate and roasting the resultant material at 400° C. until a firm deposit of copper oxide is obtained. Supported catalysts of this kind desirably contain from about 3% to about 8% copper. The copper oxide catalysts may also contain small amounts of manganese oxide as an adjuvant catalyst or they may be promoted by the addition of activated alumina. Such catalysts are very active but they necessitate close control of the reaction. Other oxidation catalysts, notably silver, silver oxide, and molybdic oxide promoted by titanium oxide have outstanding catalytic action on the oxidation of the glycols and good yields of dicarbonylic compounds have been obtained in the presence of these catalysts.

The temperature and rate of feed of the glycol to be oxidized are not critical but preferred operating ranges exist. Temperatures within the range of 225° C. to 450° C. are the desired operating levels and the preferred temperature is between 275° C. and 350° C. The rate of feed of the polyhydric alcohol to the oxidation zone may vary widely; the desired operating range being between 50 to 250 grams per hour per liter of catalyst space.

It has been found that ordinary iron and steel, the materials customarily used in the construction of equipment for carrying out the oxidation of organic compounds in the vapor phase, have an adverse effect on the oxidation of the glycols to the corresponding dicarbonylic compounds. Such materials are not, however, catalyst poisons, since the catalyst is still active in causing the glycols to be oxidized to monocarbonylic compounds and to carbon dioxide.

According to this invention, certain materials of construction have been discovered which, in distinction to ordinary iron and steel, do not repress the oxidation of the glycols to the corresponding dicarbonylic compounds when the reaction is carried out in equipment fabricated from them. These materials are aluminum, copper, copper alloys, notably the alloy containing from 94.4% to 96% copper, from 3% to 4.5% silicon and from 1.0% to 1.1% manganese, and iron, chromium and nickel alloys, such as those commonly known as stainless steel which contains 18% chromium and 8% nickel.

Improvements in the yields of the dicarbonylic compounds obtained can be accomplished if the reaction is also carried out under the conditions described in our copending applications Serial Nos. 348,438 and 348,439. That is, at least 1.8 mols of molecular oxygen per mol of glycol should be present in the oxidation zone in order that excessive amounts of lower oxidation products of the glycols than dicarbonylic compounds, as well as reaction products of the dicarbonylic compounds with the glycols, may not predominate in the oxidation products. In addition, it is highly desirable to have small amounts of a halogen or halogenated organic compound present as a selective repressant in the oxidation zone since, by this means, the ratio of dicarbonylic compounds to monocarbonylic compounds and carbon dioxide produced in the oxidation is drastically increased.

The following comparative experiments will illustrate in detail the effect of the material of construction used for the reaction equipment on the oxidation:

In two of these experiments, the reaction tube consisted of ordinary iron; in the other it was constructed of the copper-silicon-manganese alloy described above. Each tube was three feet long and one inch in diameter and was filled for a length of two feet with a catalyst composed of turnings of the copper alloy. The other conditions were the same, or differed immaterially, but the results obtained in the two types of equipment were significantly different as tabulated below.

| | Iron tube | Iron tube | Copper alloy tube |
|---|---|---|---|
| Temperature °C | 350 | 325 | 350 |
| Total gas feed cubic feet per hour | 8.5 | 8.5 | 8.5 |
| Oxygen in feed per cent by volume | 20 | 20 | 20 |
| Ethylene glycol in feed do | 1.0 | 1.5 | 1.5 |
| Repressant | None | None | None |
| Glyoxal yield per cent | 0.4 | 2.6 | 16.0 |
| Formaldehyde and formic acid yield do | 18.8 | 19.4 | 28.8 |

If a selective repressant for undesired oxidations is present in the oxidation zone, the ratio of glyoxal to formaldehyde produced in the oxidation will be increased in any event but the type of material used for the reaction vessel retains its specific influence. This is shown by the following comparative experiments in which a selective repressant was present in each instance. Two runs were made in an iron tube, three feet long and one inch in diameter, filled for a length of two feet with a catalyst composed of turnings of the copper-silicon-manganese alloy. A third run was made under comparative conditions in a tube of stainless steel of the same dimensions as the iron tube and which was packed with a copper catalyst in a similar manner. The results obtained are tabulated below:

| | Iron tube | Iron tube | Stainless steel tube |
|---|---|---|---|
| Temperature °C | 325 | 320 | 320 |
| Total gas feed cubic feet per hour | 8.5 | 8.5 | 8.5 |
| Oxygen in feed per cent by volume | 20 | 20 | 10 |
| Ethylene glycol in feed do | 2.0 | 1.5 | 2.0 |
| Repressant—ethylene dichloride do | 0.02 | 0.02 | 0.02 |
| Glyoxal yield per cent | 6.0 | 6.5 | 38.5 |
| Formaldehyde and formic acid yield do | 10.0 | 12.5 | 13.8 |

Modifications of the invention other than as described in the foregoing examples will be apparent to those skilled in the art and are included within the scope of the invention as defined by the appended claims.

We claim:

1. Process for making one of the group consisting of 1,2-dicarbonylic compounds having from two to three carbon atoms and their hydrates and polymers which comprises passing the vapors of one of the group consisting of 1,2-alkylene glycols and 1,2-polyalkylene glycols in which the alkylene group of the glycols contains from two to three carbon atoms mixed with at least 1.8 mols of molecular oxygen per mol of glycol over a copper oxidation catalyst at a temperature between 225° and 450° C. and in a confined space enclosed by an alloy having a copper base.

2. Process for making one of the group consisting of 1,2-dicarbonylic compounds having from two to three carbon atoms and their hydrates and polymers which comprises passing the vapors of one of the group consisting of 1,2-alkylene glycols and 1,2-polyalkylene glycols in which the alkylene group of the glycols contains from two to three carbon atoms mixed with at least 1.8 mols of molecular oxygen per mol of glycol over a copper oxidation catalyst at a temperature between 225° and 450° C. and in a confined space enclosed by an alloy containing 94.4% to 96% copper, from 3% to 4.5% silicon and from 1.0% to 1.1% manganese.

3. Process for making one of the group consisting of glyoxal and its hydrates and polymers which comprises passing the vapors of ethylene glycol mixed with at least 1.8 mols of molecular oxygen per mol of glycol over a copper oxidation catalyst at a temperature between 225° and 450° C. and in a confined space enclosed by an alloy having a copper base.

RAYMOND W. McNAMEE.
JESSE T. DUNN.